US012542740B2

(12) United States Patent
Liu et al.

(10) Patent No.: US 12,542,740 B2
(45) Date of Patent: Feb. 3, 2026

(54) USING CRDs TO CREATE EXTERNALLY ROUTABLE ADDRESSES AND ROUTE RECORDS FOR PODS

(71) Applicant: VMware LLC, Palo Alto, CA (US)

(72) Inventors: Danting Liu, Beijing (CN); Qian Sun, Beijing (CN); Jianjun Shen, Redwood City, CA (US); Wenfeng Liu, Beijing (CN); Donghai Han, Beijing (CN)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 18/948,182

(22) Filed: Nov. 14, 2024

(65) Prior Publication Data

US 2025/0071059 A1 Feb. 27, 2025

Related U.S. Application Data

(63) Continuation of application No. 17/960,126, filed on Oct. 4, 2022, now Pat. No. 12,177,124.

(51) Int. Cl.
*H04L 45/745* (2022.01)
*H04L 45/02* (2022.01)
*H04L 45/586* (2022.01)

(52) U.S. Cl.
CPC ............ *H04L 45/745* (2013.01); *H04L 45/02* (2013.01); *H04L 45/586* (2013.01)

(58) Field of Classification Search
CPC ...... H04L 45/745; H04L 45/02; H04L 45/586
(Continued)

(56) References Cited

U.S. PATENT DOCUMENTS

| | | | |
|---|---|---|---|
| 6,697,360 | B1 | 2/2004 | Gai et al. |
| 7,869,439 | B1 | 1/2011 | Ramberg et al. |

(Continued)

FOREIGN PATENT DOCUMENTS

| | | | |
|---|---|---|---|
| AU | 2004227600 | B2 | 5/2009 |
| CA | 3107455 | A1 | 2/2020 |

(Continued)

OTHER PUBLICATIONS

Abhashkumar, Anubhavnidhi, et al., "Supporting Diverse Dynamic Intent-based Policies Using Janus," CoNext '17, Dec. 12-15, 2017, 14 pages, ACM, Incheon, KR.

(Continued)

*Primary Examiner* — Anthony Mejia
(74) *Attorney, Agent, or Firm* — Quarles & Brady LLP

(57) ABSTRACT

Some embodiments provide an automated method for defining externally routable Pods within a Kubernetes cluster. In some embodiments, the Pod operates in a guest cluster has its own VPC (virtual private cloud) network in a datacenter with several other guest clusters that have their own VPC networks and their own set of managers. In some embodiments, a Pod within a GC can be made externally routable so that it can be directly addressable from an external client outside of the Pod's network by using two new Kubernetes CRDs (custom resource definitions), which are an IPPool CRD and a RouteSet CRD. Examples of such external clients include VMs or Pods in another GC or a supervisor cluster connected to the particular GC through a gateway, or from a machine outside of the network of all of the GCs or SC.

20 Claims, 8 Drawing Sheets

(58) Field of Classification Search
USPC .......................................................... 709/238
See application file for complete search history.

(56) References Cited

U.S. PATENT DOCUMENTS 7,890,543 B2 2/2011 Hunt et al.
7,912,955 B1 3/2011 Machiraju et al.
8,627,442 B2 1/2014 Ji et al.
8,683,560 B1 3/2014 Brooker et al.
9,152,803 B2 10/2015 Biswas et al.
9,225,638 B2 12/2015 Jain et al.
9,258,312 B1 2/2016 O'Neill et al.
9,531,590 B2 12/2016 Jain et al.
9,536,077 B2 1/2017 Bignon et al.
9,590,901 B2 3/2017 Tubaltsev et al.
9,594,546 B1 3/2017 Todd et al.
9,674,275 B1 6/2017 Engers et al.
9,755,898 B2 9/2017 Jain et al.
9,774,537 B2 9/2017 Jain et al.
9,813,509 B1 11/2017 Visser et al.
9,825,810 B2 11/2017 Jain et al.
9,935,827 B2 4/2018 Jain et al.
9,979,641 B2 5/2018 Jain et al.
10,095,669 B1 10/2018 Karppanen
10,122,735 B1 11/2018 Wohlgemuth
10,129,077 B2 11/2018 Jain et al.
10,135,737 B2 11/2018 Jain et al.
10,193,977 B2 1/2019 Ke et al.
10,205,701 B1 2/2019 Voss et al.
10,225,137 B2 3/2019 Jain et al.
10,257,095 B2 4/2019 Jain et al.
10,270,796 B1 4/2019 Veeraswamy et al.
10,320,679 B2 6/2019 Jain et al.
10,341,233 B2 7/2019 Jain et al.
10,496,605 B2 12/2019 Melnik et al.
10,516,568 B2 12/2019 Jain et al.
10,547,521 B1 1/2020 Roy et al.
10,594,743 B2 3/2020 Hong et al.
10,609,091 B2 3/2020 Hong et al.
10,613,888 B1 4/2020 Mentz et al.
10,628,144 B2 4/2020 Myneni et al.
10,652,143 B2 5/2020 Ravinoothala et al.
10,693,782 B2 6/2020 Jain et al.
10,708,368 B1 7/2020 Young et al.
10,725,836 B2 7/2020 Savenkov et al.
10,795,909 B1 10/2020 Bond et al.
10,812,337 B2 10/2020 Vaidya et al.
10,841,226 B2 11/2020 Mariappan et al.
10,942,788 B2 3/2021 Palavalli et al.
10,944,691 B1 3/2021 Raut et al.
10,951,661 B1 3/2021 Medan et al.
10,972,341 B2 4/2021 Mudigonda
10,972,386 B2 4/2021 Mackie et al.
11,074,091 B1 7/2021 Nayakbomman et al.
11,086,700 B2 8/2021 Myneni et al.
11,159,366 B1 10/2021 Gawade et al.
11,163,618 B1 * 11/2021 Wei ......................... G06F 16/16
11,190,491 B1 11/2021 Kaciulis et al.
11,194,483 B1 12/2021 Dontu et al.
11,277,309 B2 3/2022 Vaidya et al.
11,316,822 B1 4/2022 Gawade et al.
11,436,057 B2 9/2022 Shen et al.
11,500,688 B2 11/2022 Liu et al.
11,570,146 B2 1/2023 Liu et al.
11,606,254 B2 3/2023 Liu et al.
11,671,400 B2 6/2023 Zhou et al.
11,689,425 B2 6/2023 Vaidya et al.
11,689,497 B2 6/2023 Shen et al.
2004/0098154 A1 5/2004 McCarthy
2004/0098462 A1 * 5/2004 Horvitz .................. G06Q 10/10
709/207
2004/0254998 A1 * 12/2004 Horvitz ................... H04L 51/04
709/206
2005/0129019 A1 6/2005 Cheriton
2007/0244962 A1 10/2007 Laadan et al.
2007/0245334 A1 10/2007 Nieh et al.
2010/0149996 A1 6/2010 Sun
2010/0177674 A1 7/2010 Aggarwal
2010/0211815 A1 8/2010 Mankovskii et al.
2010/0246545 A1 9/2010 Berzin
2010/0293378 A1 11/2010 Xiao et al.
2011/0161988 A1 6/2011 Kashyap
2011/0194494 A1 8/2011 Aso et al.
2011/0282936 A1 11/2011 Chekhanovskiy et al.
2011/0289508 A1 11/2011 Fell et al.
2012/0117226 A1 5/2012 Tanaka et al.
2012/0150912 A1 6/2012 Ripberger
2012/0304275 A1 11/2012 Ji et al.
2013/0018994 A1 1/2013 Flavel et al.
2013/0019314 A1 1/2013 Ji et al.
2013/0125230 A1 5/2013 Koponen et al.
2013/0174168 A1 7/2013 Abuelsaad et al.
2013/0266019 A1 10/2013 Qu et al.
2013/0283339 A1 10/2013 Biswas et al.
2014/0036730 A1 2/2014 Nellikar et al.
2014/0129690 A1 5/2014 Jaisinghani et al.
2014/0164897 A1 6/2014 Yucel et al.
2014/0201145 A1 * 7/2014 Dorman ................ G06F 16/178
707/634
2014/0223556 A1 8/2014 Bignon et al.
2014/0237100 A1 8/2014 Cohn et al.
2014/0258479 A1 9/2014 Tenginakai et al.
2015/0063166 A1 3/2015 Sif et al.
2015/0081767 A1 3/2015 Evens
2015/0100704 A1 4/2015 Davie et al.
2015/0172093 A1 6/2015 Kaneko et al.
2015/0222598 A1 8/2015 Koponen et al.
2015/0249574 A1 9/2015 Zhang
2015/0263899 A1 9/2015 Tubaltsev et al.
2015/0263946 A1 9/2015 Tubaltsev et al.
2015/0281042 A1 * 10/2015 Agarwal ............... H04L 45/741
709/238
2015/0281048 A1 * 10/2015 Agarwal ............. H04L 61/5007
370/254
2015/0317169 A1 11/2015 Sinha et al.
2015/0348044 A1 12/2015 Smith
2015/0379281 A1 12/2015 Feroz et al.
2016/0034111 A1 * 2/2016 Sahai ..................... G06Q 10/10
715/730
2016/0036860 A1 2/2016 Xing et al.
2016/0080422 A1 3/2016 Belgodere et al.
2016/0094454 A1 3/2016 Jain et al.
2016/0094457 A1 3/2016 Jain et al.
2016/0094650 A1 3/2016 Rio
2016/0094661 A1 3/2016 Jain et al.
2016/0182293 A1 6/2016 Benedetto et al.
2016/0217301 A1 7/2016 Watanabe et al.
2016/0239326 A1 8/2016 Kaplan et al.
2016/0241436 A1 8/2016 Fourie et al.
2016/0254964 A1 9/2016 Benc
2016/0269318 A1 9/2016 Su et al.
2016/0294612 A1 10/2016 Ravinoothala et al.
2016/0315809 A1 10/2016 McMurry et al.
2016/0335129 A1 11/2016 Behera et al.
2016/0337334 A1 11/2016 Murr
2017/0005923 A1 1/2017 Babakian
2017/0005986 A1 1/2017 Bansal et al.
2017/0031956 A1 2/2017 Burk et al.
2017/0063632 A1 3/2017 Goliya et al.
2017/0063782 A1 3/2017 Jain et al.
2017/0085561 A1 3/2017 Han et al.
2017/0093790 A1 3/2017 Banerjee et al.
2017/0171144 A1 6/2017 Sagiraju et al.
2017/0177394 A1 6/2017 Barzik et al.
2017/0195210 A1 7/2017 Jacob et al.
2017/0206034 A1 7/2017 Fetik
2017/0207963 A1 7/2017 Mehta et al.
2017/0286698 A1 10/2017 Shetty et al.
2017/0317954 A1 11/2017 Masurekar et al.
2017/0324781 A1 11/2017 Hu et al.
2017/0332307 A1 11/2017 Pan
2017/0353351 A1 12/2017 Cheng et al.
2017/0366416 A1 12/2017 Beecham et al.
2017/0374106 A1 12/2017 Hamou et al.

(56) References Cited

U.S. PATENT DOCUMENTS

| | | | |
|---|---|---|---|
| 2018/0040004 | A1* | 2/2018 | Greenberger ......... H04L 67/535 |
| 2018/0063194 | A1 | 3/2018 | Vaidya et al. |
| 2018/0083835 | A1 | 3/2018 | Cole et al. |
| 2018/0089299 | A1 | 3/2018 | Collins et al. |
| 2018/0114012 | A1 | 4/2018 | Sood et al. |
| 2018/0123943 | A1 | 5/2018 | Lee et al. |
| 2018/0131675 | A1 | 5/2018 | Sengupta et al. |
| 2018/0167453 | A1 | 6/2018 | Luo |
| 2018/0167458 | A1 | 6/2018 | Ould-Brahim et al. |
| 2018/0167487 | A1 | 6/2018 | Vyas et al. |
| 2018/0183757 | A1 | 6/2018 | Gunda et al. |
| 2018/0205605 | A1 | 7/2018 | Mittal et al. |
| 2018/0234459 | A1 | 8/2018 | Kung et al. |
| 2018/0248827 | A1 | 8/2018 | Scharber et al. |
| 2018/0262424 | A1 | 9/2018 | Roeland et al. |
| 2018/0287996 | A1 | 10/2018 | Tripathy et al. |
| 2018/0295036 | A1 | 10/2018 | Krishnamurthy et al. |
| 2018/0331885 | A1 | 11/2018 | Raymond et al. |
| 2018/0359323 | A1 | 12/2018 | Madden |
| 2019/0034237 | A1 | 1/2019 | Siddappa et al. |
| 2019/0036868 | A1 | 1/2019 | Chandrashekhar et al. |
| 2019/0042518 | A1 | 2/2019 | Marolia et al. |
| 2019/0068500 | A1 | 2/2019 | Hira |
| 2019/0068544 | A1 | 2/2019 | Hao et al. |
| 2019/0079751 | A1 | 3/2019 | Foskett et al. |
| 2019/0087244 | A1 | 3/2019 | Turner |
| 2019/0097879 | A1 | 3/2019 | Cai et al. |
| 2019/0102280 | A1 | 4/2019 | Caldato et al. |
| 2019/0103992 | A1 | 4/2019 | Cidon et al. |
| 2019/0132220 | A1 | 5/2019 | Boutros et al. |
| 2019/0132221 | A1 | 5/2019 | Boutros et al. |
| 2019/0132283 | A1 | 5/2019 | Ballard et al. |
| 2019/0140895 | A1 | 5/2019 | Ennis, Jr. et al. |
| 2019/0140921 | A1 | 5/2019 | Xu et al. |
| 2019/0149512 | A1 | 5/2019 | Sevinc et al. |
| 2019/0149516 | A1 | 5/2019 | Rajahalme et al. |
| 2019/0149518 | A1 | 5/2019 | Sevinc et al. |
| 2019/0171650 | A1 | 6/2019 | Botev et al. |
| 2019/0173780 | A1 | 6/2019 | Hira et al. |
| 2019/0229987 | A1 | 7/2019 | Shelke et al. |
| 2019/0230126 | A1 | 7/2019 | Kumar et al. |
| 2019/0238363 | A1 | 8/2019 | Boutros et al. |
| 2019/0238364 | A1 | 8/2019 | Boutros et al. |
| 2019/0245757 | A1 | 8/2019 | Meyer et al. |
| 2019/0273683 | A1 | 9/2019 | Jiang et al. |
| 2019/0288947 | A1 | 9/2019 | Jain et al. |
| 2019/0306036 | A1 | 10/2019 | Boutros et al. |
| 2019/0306086 | A1 | 10/2019 | Boutros et al. |
| 2019/0356693 | A1 | 11/2019 | Cahana et al. |
| 2019/0384645 | A1 | 12/2019 | Palavalli et al. |
| 2019/0386877 | A1 | 12/2019 | Vaidya et al. |
| 2020/0065080 | A1 | 2/2020 | Myneni et al. |
| 2020/0065166 | A1 | 2/2020 | Myneni et al. |
| 2020/0073692 | A1 | 3/2020 | Rao et al. |
| 2020/0076684 | A1 | 3/2020 | Naveen et al. |
| 2020/0076685 | A1 | 3/2020 | Vaidya et al. |
| 2020/0076734 | A1 | 3/2020 | Naveen et al. |
| 2020/0084112 | A1 | 3/2020 | Kandaswamy et al. |
| 2020/0092275 | A1 | 3/2020 | Seed et al. |
| 2020/0112504 | A1 | 4/2020 | Osman |
| 2020/0213366 | A1 | 7/2020 | Hong et al. |
| 2020/0250009 | A1 | 8/2020 | Jaeger et al. |
| 2020/0250074 | A1 | 8/2020 | Zhang et al. |
| 2020/0252376 | A1 | 8/2020 | Feng et al. |
| 2020/0301801 | A1 | 9/2020 | Hegde |
| 2020/0314006 | A1 | 10/2020 | Mackie et al. |
| 2020/0314173 | A1 | 10/2020 | Pahwa et al. |
| 2020/0344120 | A1 | 10/2020 | Pianigiani et al. |
| 2020/0366558 | A1 | 11/2020 | Vaidya et al. |
| 2020/0374186 | A1 | 11/2020 | Scott |
| 2020/0379812 | A1 | 12/2020 | Ranjan et al. |
| 2020/0382556 | A1 | 12/2020 | Woolward et al. |
| 2020/0401457 | A1 | 12/2020 | Singhal et al. |
| 2020/0403853 | A1 | 12/2020 | Garipally et al. |
| 2020/0403860 | A1 | 12/2020 | Lewis et al. |
| 2020/0409671 | A1 | 12/2020 | Mazurskiy |
| 2021/0004292 | A1 | 1/2021 | Zlotnick et al. |
| 2021/0064442 | A1 | 3/2021 | Alluboyina et al. |
| 2021/0099335 | A1 | 4/2021 | Li |
| 2021/0165695 | A1 | 6/2021 | Palavalli et al. |
| 2021/0200814 | A1 | 7/2021 | Tal et al. |
| 2021/0218652 | A1 | 7/2021 | Raut et al. |
| 2021/0243164 | A1 | 8/2021 | Murray et al. |
| 2021/0266255 | A1* | 8/2021 | Ganapathy .......... H04L 12/4641 |
| 2021/0273946 | A1 | 9/2021 | Iqbal et al. |
| 2021/0306285 | A1 | 9/2021 | Hirasawa et al. |
| 2021/0311803 | A1 | 10/2021 | Zhou et al. |
| 2021/0314190 | A1 | 10/2021 | Liu et al. |
| 2021/0314239 | A1 | 10/2021 | Shen et al. |
| 2021/0314240 | A1 | 10/2021 | Liu et al. |
| 2021/0314300 | A1 | 10/2021 | Shen et al. |
| 2021/0314361 | A1 | 10/2021 | Zhou et al. |
| 2021/0314388 | A1 | 10/2021 | Zhou et al. |
| 2021/0328858 | A1 | 10/2021 | Asveren et al. |
| 2021/0349765 | A1 | 11/2021 | Zhou et al. |
| 2021/0365308 | A1 | 11/2021 | Myneni et al. |
| 2021/0397466 | A1 | 12/2021 | McKee et al. |
| 2021/0409336 | A1 | 12/2021 | Talur et al. |
| 2022/0004410 | A1 | 1/2022 | Chen |
| 2022/0012045 | A1 | 1/2022 | Rudraraju et al. |
| 2022/0035651 | A1 | 2/2022 | Maurya et al. |
| 2022/0038311 | A1 | 2/2022 | Shen et al. |
| 2022/0070250 | A1 | 3/2022 | Baid et al. |
| 2022/0158926 | A1 | 5/2022 | Wennerström et al. |
| 2022/0182439 | A1 | 6/2022 | Zhou et al. |
| 2022/0200865 | A1 | 6/2022 | Vaidya et al. |
| 2022/0278926 | A1 | 9/2022 | Sharma et al. |
| 2022/0303246 | A1 | 9/2022 | Miriyala et al. |
| 2022/0321495 | A1 | 10/2022 | Liu et al. |
| 2022/0400053 | A1 | 12/2022 | Liu et al. |
| 2023/0070224 | A1 | 3/2023 | Huo et al. |
| 2023/0104568 | A1 | 4/2023 | Miriyala et al. |
| 2023/0179484 | A1 | 6/2023 | Liu et al. |
| 2023/0179573 | A1 | 6/2023 | Sosnovich et al. |
| 2023/0231741 | A1 | 7/2023 | Tang et al. |
| 2023/0231827 | A1 | 7/2023 | Tang et al. |
| 2023/0244591 | A1 | 8/2023 | Sun et al. |
| 2024/0080277 | A1 | 3/2024 | Lee et al. |
| 2024/0152245 | A1* | 5/2024 | Broughton .............. G06F 3/013 |
| 2024/0236034 | A1 | 7/2024 | Kim et al. |

FOREIGN PATENT DOCUMENTS

| | | | |
|---|---|---|---|
| CN | 105897946 | A | 8/2016 |
| CN | 106789367 | A | 5/2017 |
| CN | 107947961 | A | 4/2018 |
| CN | 108809722 | A | 11/2018 |
| CN | 110531987 | A | 12/2019 |
| CN | 110611588 | A | 12/2019 |
| CN | 111327640 | A | 6/2020 |
| CN | 111371627 | A | 7/2020 |
| CN | 111865643 | A | 10/2020 |
| CN | 113141386 | A | 7/2021 |
| EP | 2464151 | A2 | 6/2012 |
| EP | 2464152 | A2 | 6/2012 |
| EP | 2830270 | A1 | 1/2015 |
| EP | 3316532 | A1 | 5/2018 |
| EP | 3617879 | A1 | 3/2020 |
| JP | 2011070707 | A | 4/2011 |
| JP | 2012099048 | A | 5/2012 |
| JP | 2014535213 | A | 12/2014 |
| JP | 2015115043 | A | 6/2015 |
| JP | 2018523932 | A | 8/2018 |
| WO | 2011159842 | A2 | 12/2011 |
| WO | 2013063330 | A1 | 5/2013 |
| WO | 2016160523 | A1 | 10/2016 |
| WO | 2018044341 | A1 | 3/2018 |
| WO | 2018044352 | A1 | 3/2018 |
| WO | 2019241086 | A1 | 12/2019 |
| WO | 2020041073 | A1 | 2/2020 |
| WO | 2020041074 | A1 | 2/2020 |
| WO | 2021196080 | A1 | 10/2021 |

(56) References Cited

FOREIGN PATENT DOCUMENTS

| | | | |
|---|---|---|---|
| WO | 2022026028 | A1 | 2/2022 |
| WO | 2022204941 | A9 | 10/2022 |
| WO | 2023133797 | A1 | 7/2023 |

OTHER PUBLICATIONS

Abwnawar, Nasser, "A Policy-Based Management Approach to Security in Cloud Systems," Feb. 2020, 184 pages, De Monfort University, Leicester, UK.
Author Unknown, "Advanced Networking Features in Kubernetes and Container Bare Metal," Document 606835-001, Dec. 2018, 42 pages, Intel Corporation.
Author Unknown, "Chapter 4: Default Security Policy," IBM Security Access Manager Version 9.0, Oct. 2015, 18 pages.
Author Unknown, "Containers and Container Networking for Network Engineers: VMware NSX Container Networking," Jan. 2018, 58 pages, VMware, Inc.
Author Unknown, "E-Security Begins with Sound Security Policies," Jun. 14, 2001, 23 pages, Symantec Corporation.
Author Unknown, "Kubernetes Core Concepts for Azure Kubernetes Service (AKS)", Jun. 3, 2019, 6 pages, retrieved from https://docs.microsoft.com/en-us/azure/aks/concepts-clusters-workloads.
Author Unknown, "NSX vSphere API Guide—NSX 6.2 for vSphere," Jan. 6, 2017, 400 pages, VMware, Inc.
Author Unknown, "OpenShift Container Platform 4.6," Mar. 3, 2021, 41 pages, Red Hat, Inc.
Balla, David, et al., "Adaptive Scaling of Kubernetes Pods," NOMS 2020—2020 IEEE/IFIP Network Operations and Management Symposium, Apr. 20-24, 2020, 5 pages, IEEE, Budapest, Hungary.
Chawla, Harsh, et al., "Building Microservices Applications on Microsoft Azure: Designing, Developing, Deploying, and Monitoring," Month Unknown 2019, 271 pages, Harsh Chawla and Hemant Kathuria, India.
Darabseh, Ala, et al., "SDDC: A Software Defined Datacenter Experimental Framework," Proceedings of the 2015 3rd International Conference on Future Internet of Things and Cloud, Aug. 24-26, 2015, 6 pages, IEEE Computer Society, Washington, D.C., USA.
Non-published Commonly Owned U.S. Appl. No. 17/684,160, filed Mar. 1, 2022, 40 pages, VMware, Inc.
Non-published Commonly Owned U.S. Appl. No. 17/684,169, filed Mar. 1, 2022, 41 pages, VMware, Inc.
Non-published Commonly Owned U.S. Appl. No. 17/696,366, filed Mar. 16, 2022, 27 pages, VMware, Inc.
Non-published Commonly Owned U.S. Appl. No. 17/724,433, filed Apr. 19, 2022, 51 pages, VMware, Inc.
Non-published Commonly Owned U.S. Appl. No. 17/724,436, filed Apr. 19, 2022, 51 pages, VMware, Inc.
Non-Published Commonly Owned U.S. Appl. No. 18/102,700, filed Jan. 28, 2023, 39 pages, VMware, Inc.
Qi, Shixiong, et al., "Assessing Container Network Interface Plugins: Functionality, Performance, and Scalability," IEEE Transactions on Network and Service Management, Mar. 2021, 16 pages, vol. 198, No. 1, IEEE.
Rouse, Margaret, "What is SDDC (software-defined data center)?—Definition from WhatIs.com," Mar. 2017, 5 pages, TechTarget.com.
Sayfan, Gigi, "Mastering Kubernetes: Automating container deployment and management," May 2017, 426 pages, Packt Publishing, Birmingham, UK.
Wodicka, Brent, "A Developer's Guide to Container Orchestration, Kubernetes, & AKS," Mar. 19, 2019, 5 pages, AIS, Reston, VA, USA.
Author Unknown, "NSX and Micro-segmentation," Jan. 3, 2017, 2 pages, retrieved from https://www.youtube.com/watch?v=I_QtISXaxkE.
Author Unknown, "NSX Policy API: Getting Started Guide," Technical White Paper, Sep. 2019, 28 pages, VMware, Inc.
Author Unknown, "VMware NSX for vSphere 6.4—Application Rule Manager Enhancements," Jan. 20, 2018, 2 pages, retrieved from https://www.youtube.com/watch?v=r3IKNkt5mi8.
Author Unknown, "VMware NSX-T 2.4: Advancing NSX Everywhere for Everyone," Feb. 27, 2019, 2 pages, retrieved from https://www.youtube.com/watch?v=lqPyRBWABHg.
Non-Published Commonly Owned U.S. Appl. No. 18/211,360, filed Jun. 19, 2023, 41 pages, VMware, Inc.
Non-published Commonly Owned U.S. Appl. No. 18/227,306, filed Jul. 28, 2023, 37 pages, VMware, Inc.
Patni, Sanjay, "Pro RESTful APIs," Month Unknown 2017, 136 pages, Apress, New York City, NY, USA.

* cited by examiner

IPPool CRD

205

```
apiVersion: apiextensions.k8s.io/v1beta1
kind: CustomResourceDefinition
metadata:
  name: ippools.vmware.com
spec:
  group: vmware.com
  versions:
    - name: v1alpha1
      served: true
      storage: true
  scope: Namespaced
  names:
    plural: ippools
    singular: ippool
    kind: IPPool
    shortNames:
    - ippool
---
```

210

```
apiVersion: vmware.com/v1alpha1
kind: IPPool
metadata:
  name: ippool-1
spec:
  subnets:
    - prefixLength: 24   # cidr prefix length
      ipFamily: ipv4     # IP family, ipv4 or ipv6
      name: worker-1     # Node name
    - prefixLength: 24   # cidr prefix length
      ipFamily: ipv4     # IP family, ipv4 or ipv6
      name: worker-2     # Node name
status:
  subnets:
    - cidr: 192.168.100.0/24    # NCP allocated IP pool
      name: worker-1
    - cidr: 192.168.101.0/24    # NCP allocated IP pool
      name: worker-2
  conditions:
    - type: ready  # Type of condition, 'ready' or 'failure'
      status: true # Status of the condition, one of True, False, Unknown
      reason:  ... # Brief reason
      message: ... # Human readable message indicating details
```

*Figure 2*

RouteSet CRD

405

```
apiVersion: apiextensions.k8s.io/v1beta1
kind: CustomResourceDefinition
metadata:
  name: routesets.vmware.com
spec:
  group: vmware.com
  versions:
    - name: v1alpha1
      served: true
      storage: true
  scope: Namespaced
  names:
    plural: routesets
    singular: routeset
    kind: RouteSet
    shortNames:
    - routeset
---
```

410

```
apiVersion: vmware.com/v1alpha1
kind: RouteSet
metadata:
  name: routeset1
spec:
  routes:
  - destination: <podCIDR>
    target: <nodeIPAddress>
    name: <routeName>
status:
  routes:
  - destination: <podCIDR>
    target: <nodeIPAddress>
    name: <routeName>
  conditions:
    - type: ready  # Type of condition, 'ready' or 'failure'
      status: true # Status of the condition, one of True, False, Unknown
      reason:  ... # Brief reason
      message: ... # Human readable message indicating details
```

*Figure 4*

/policy/api/v1/infra/ip-pools/<ip-pool-id>/ip-subnets/<ip-subnet-id>

```
PATCH https://<policy-mgr>/policy/api/v1/infra/ip-pools/IpPool-Tenant-1/ip-subnets/Subnet-1
{
 "display_name": "sc-cluster-1-gc-node1-subnet",
 "resource_type": "IpAddressPoolBlockSubnet",
 "size": "24",
 "ip_block_path":"/infra/ip-blocks/routable-block-1",
 "tags": [
  {
   "scope": "ncp/cluster",
   "tag": "sc-cluster-1"
  },
  {
   "scope": "ncp/project",
   "tag": "gc-ns-1"
  },
  {
   "scope": "ncp/vnet",
   "tag": "guest-cluster-network1"
  },
  {
   "scope": "ncp/vnet_uid",
   "tag": "2897a4c6-d51c-480e-8833-3d1a1c0a6327"
  },
  {
   "scope": "ncp/vnet_node",
   "tag": "gc-node1"
  },
 ]
}
```

*Figure 6*

API to Create Static Route

```
# PATCH https://<policy-mgr>/policy/api/v1/infra/tier-1s/<t1-id>/static-routes/<route-id>
{
  "network": "100.96.1.0/24",      // podCIDR
  "next_hops": [
    {
      "ip_address": "172.50.0.137",   // node IP address
    }
  ]
  "tags": [
    {
      "scope": "ncp/cluster",
      "tag": "sc-cluster-1"
    },
    {
      "scope": "ncp/project",
      "tag": "gc-ns-1"
    },
    {
      "scope": "ncp/routeset",
      "tag": "gc-node-1"
    },
    {
      "scope": "ncp/routeset_uid",
      "tag": "2897a4c6-d51c-480e-8833-3d1a1c0a6327"
    }
  ]
}
```

*Figure 7*

USING CRDs TO CREATE EXTERNALLY ROUTABLE ADDRESSES AND ROUTE RECORDS FOR PODS

CLAIM OF BENEFIT TO PRIOR APPLICATIONS

The present application is a continuation application of U.S. application Ser. No. 17/960,126 filed Oct. 4, 2022, and published on Apr. 4, 2024, under Publication No. 2024-0113968. This application is incorporated herein by reference in its entirety for all purposes.

BACKGROUND

With the recent increase in cloud native applications, today there is more demand than ever for fast deployment of on-demand networking for connecting machines that are deployed in software defined datacenters (SDDC). It is desirable to provide auto-deployed networking solutions as many compute-cluster administrators do not have extensive knowledge of networking. However, for administrators who wish to adjust their system's networking, it is desirable to provide such administrators with the ability to configure and customize their network deployments.

BRIEF SUMMARY

Some embodiments provide an automated method for defining externally routable Pods within a Kubernetes cluster. Externally routable Pods are Pods that are directly addressable from an external client outside of the Pod's network. In some embodiments, the Pod (1) resides in a guest cluster that is managed by its own set of one or more managers, and (2) connects to the external network through one or more intervening gateway routers that are configured by a set of one or more controllers of a supervisor cluster. In some embodiments, the Pod's guest cluster has its own VPC (virtual private cloud) network in a datacenter with several other guest clusters that have their own VPC networks and their own set of managers.

In some embodiments, a Pod within a GC can be made externally routable so that it can be directly addressable from an external client outside of the Pod's network by using two new Kubernetes CRDs (custom resource definitions), which are an IPPool CRD and a RouteSet CRD. Examples of such external clients include VMs or Pods in another GC or a supervisor cluster connected to the particular GC through a gateway, or from a machine outside of the network of all of the GCs or SC.

At a control plane of a supervisor second cluster (SC), the method of some embodiments (1) receives, from a server, notification that an IPPool custom resource instance has been created in response to an addition of the worker node to the first cluster, (2) creates a set of one or more externally routable IP subnets for the IPPool, and (3) provides, to the server, the set of externally routable IP subnets for the server to use to update IPPool customer resource instance. The method then provides a status update to a manager in the Pod's GC, which this manager then uses to direct a Kubernetes manager to update a CIDR (Classless Inter-Domain Routing) of the Pod on the worker node.

Before the SC control plane receives the notification, the Kubernetes manager in some embodiments sends to the manager of the Pod's GC a notification that the worker node has been added, so that this manager can then send an order to the server to create an IPPool custom resource based on an IPPool CRD. The server also receives from the manager of the Pod's GC, a request to create a RouteSet custom resource based on the RouteSet CRD. This manager then creates the RouteSet CR and sends the SC control plane a notification that a RouteSet CR has been added.

The SC control plane, in turn, creates in response one or more static routes to deploy at one or more intervening gateway routers between the Pod in the first cluster of the VPC and a network external to a first network for the first VPC. As mentioned above, the external network can be the SC network, the network of another GC, or a network residing outside of the datacenter on the other side of its gateways.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description, and Drawings.

BRIEF DESCRIPTION OF THE DRAWINGS

The novel features of the invention are set forth in the appended claims. However, for purposes of explanation, several embodiments of the invention are set forth in the following figures.

FIG. 2 conceptually illustrates an example of an IPPool CRD and CR that is specified in some embodiments.

FIG. 4 conceptually illustrates an example of a routeset1 CR that is defined based on this CRD.

FIG. 6 conceptually illustrates an example of an IPPool API.

FIG. 7 conceptually illustrates an example of an API to create a static route on a T1 router.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Figure 1:
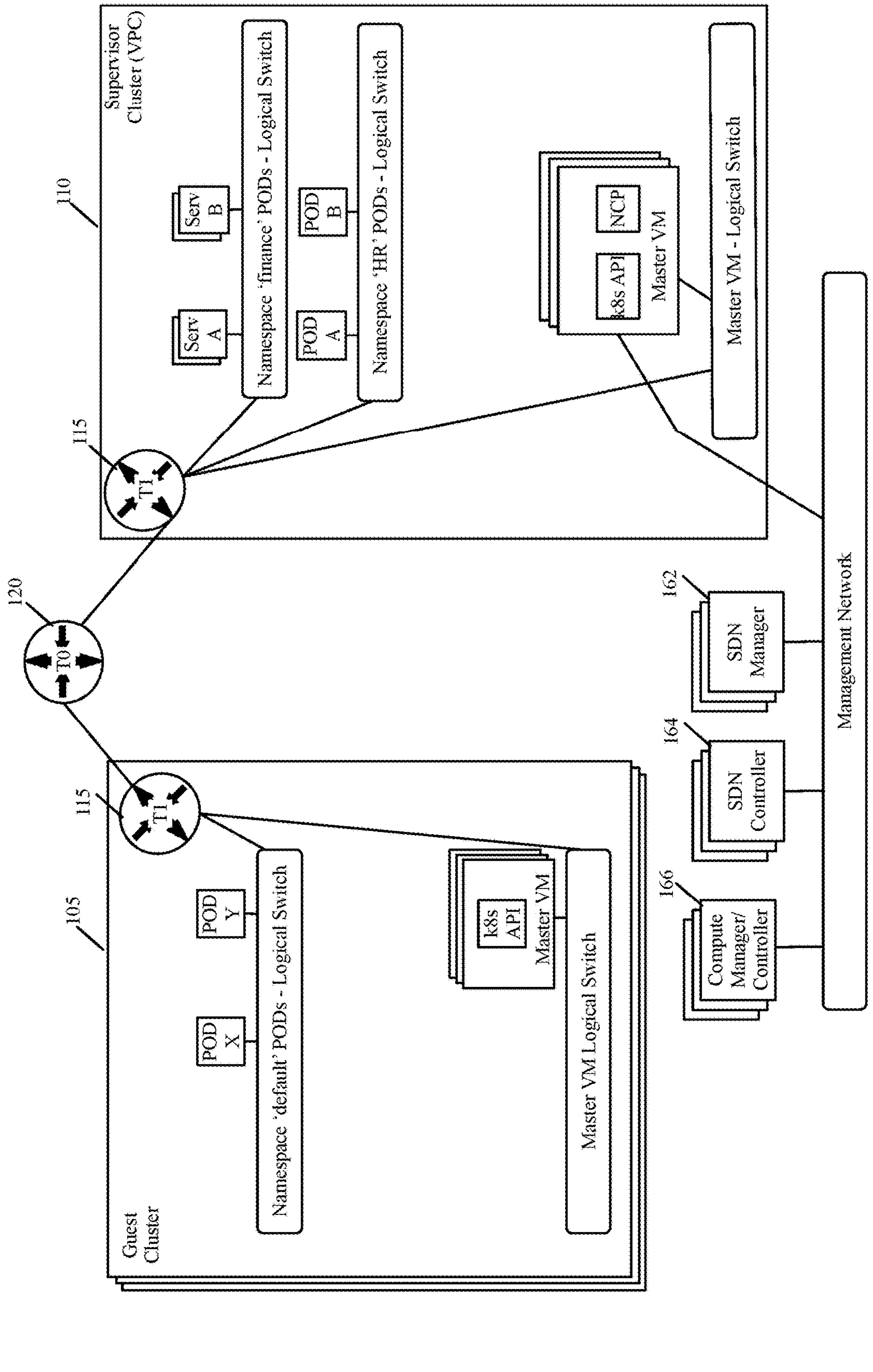
FIG. 1 conceptually illustrates an example of externally routable Pods that are defined in a guest cluster.

Some embodiments provide an automated method for defining externally routable Pods within a Kubernetes cluster. Externally routable Pods are Pods that are directly addressable from an external client outside of the Pod's network. FIG. 1 illustrates an example of externally routable Pods that are defined in a guest cluster. This figure illustrates several guest clusters 105, a supervisor cluster 110 and two tiers (T0 and T1) of gateway routers 115 and 120 that connect these clusters. In this example, each GC has its own tier 1 (T1) router, the SC has its own T1 router and all the T1 routers connect to one T0 router.

In other embodiments, other gateway router architectures are used. For instance, in some embodiments, one tier 1 (T1) gateway router connects the different guest clusters (GCs) and supervisor cluster (SC). In still other embodiments, the supervisor cluster has one tier 1 router for each of its namespaces and each guest cluster connects to the SC T1 router for the namespace under with the guest cluster operates.

In some embodiments, each guest or supervisor cluster has its own compute and network managers/controllers. In addition, the supervisor cluster has managers and controllers for configuring the gateways between the GCs and between the GCs/SC and external networks on the other side of the Tier 0 gateway router 120. In some embodiments, the SC 110 also has responsibility of assigning for a worker node in a GC a set of IP addresses (e.g., an IP CIDR) that allows Pods on this worker node to be externally routable from machines outside of the GC's network (e.g., from machines outside of the GC's virtual private cloud, VPC).

In some embodiments, a Pod within a GC can be made externally routable so that it can be directly addressable from an external client outside of the Pod's network by using two new Kubernetes CRDs, which are an IPPool CRD and a RouteSet CRD. Examples of such external clients include VMs or Pods in another GC or a supervisor cluster connected to the particular GC through a gateway, or from a machine outside of the network of all of the GCs or SC.

In some embodiments, the scope that supports routable Pod CIDRs for a guest cluster includes (1) inside the supervisor cluster (T0 router domain), such that the Pod traffic is routable within the SC T0 domain, and can be routed across SC Namespaces, and (2) global scope across SC, such that the Pod traffic can be routed to an external network outside of the SC T0.

To allow a GC Pod be routable from outside of the GC network, the SC controllers as well as the SC-adapter controllers have to be configured as follows. To allow traffic to be sent to and received from the externally routable Pod, the SC controller sets one or more static routes for the Pod network are added in some embodiments on one or more intervening gateways (e.g., Tier-1 router that is connected with GC node's segment). Some embodiments define service rules that are enforced at the gateways with the static routes (e.g., SC T1 router) on the packets that are sent to or received from the externally routable Pod.

Also, for different routable scope, static route advertisement on Tier-1 router and Tier-0 router are different in some embodiments. For instance, inside Supervisor Cluster T0 domain, some embodiments enable static route advertisement on T1 router and enable route re-distribution (Tier-1 static routes) on T0 router, but do not advertise static route to T0 BGP neighbors. For the global scope (outside of T0 domain), some embodiments enable static route advertisement on T1 and enable route re-distribution (Tier-1 static routes) on T0 router, and advertise static route to T0 BGP neighbors.

In some embodiments, the GC control plane does not talk directly with the SC control plane. Instead, in these embodiments, a network container plugin (referred to as NCP) on the SC receives information and communicates with the SC control plane to initiate the configuration changes to the SC control plane. One example of NCP is used in VMware's vSphere system. In this system, NCP is a control plane module that run as a Kubernetes pod in the Supervisor cluster control plane. NCP watches for network resources added through the Kubernetes API and orchestrates the creation of corresponding objects in NSX environment of vSphere.

The overall workflow for using the IPPool and RouteSet CRDs is as follows. In some embodiments, the SC has a Network Profile that includes a Namespace level routable CIDR configuration, which could be used to assign IP addresses to a GC Pod. In some embodiments, there is a NamespaceNetwork CR (custom resource, which is an instance of CRD) created based on the Network Profile configurations. The NCP will allocate subnets from NamespaceCIDR in NamespaceNetwork CR.

During the Guest Cluster creation, some embodiments add routing properties in a KubernetesCluster CRD to configure routable Pods. Also, to add externally routable Pod to a GC, some embodiments use the two new CRDs, RouteSet CRD and IPPool CRD, to assign one or more IP subnets to the worker node and to define statistic routes for the Pod. In some embodiments, the GCCP service creates the IPPool CRD to request the GC Node's Pod CIDR. The NCP will then allocate one or more subnets from the SC Namespace CIDR.

The RouteSet CRD is then used to configure static routes on the SC Namespace network for the GC Pod CIDRs. The GC cloud provider (GCCP) service in some embodiments creates a RouteSet CR for each GC Node in the Supervisor Namespace, with the node.PodCIDR. The NCP will create a static route on the SC Namespace T1. The GCCP service is a Kubernetes control plane service that interacts with cloud provider layer (e.g., Amazon Web Services, Google Cloud, vSphere, etc.) to configure cloud services (e.g., load balancer, route table, routable IP allocation, storage volume, etc.) for a Kubernetes cluster. When the SC is operated by vSphere, the cloud provider layer is the SC API server. The SC API server in some embodiments is the WCP supervisor Kubernetes API server.

In some embodiments, the GCCP service will create a single IPPool CR for each guest cluster. After the NCP allocates subnets from the SC Namespace IPPool, the GCCP service will set it to Node.podCIDR. The GCCP service will set the Node name and subnet prefix and IP family in IPPool CR, while the NCP will update the CIDR to IPPool CR. For GC Node scale up/down in runtime, the GCCP service will create/delete IPPool CR accordingly, and then update the Node.podCIDR.

FIG. 2 illustrates an example of an IPPool CRD 200 and CR 205 that is specified in some embodiments. As shown, the CRD has a scope and name fields, identifying the namespace scope and several names associated with the CRD. The CR 205 has a metadata attribute containing its name, plus spec and status attributes. As shown, the subnet attributes in this example specify two subnets each with a 24 value prefix length and IPv4 type in this instance. The status attribute specifies two subnets, 192.168.100.0/24 and 192.168.101.0/24, as well as several condition values.

Figure 3:
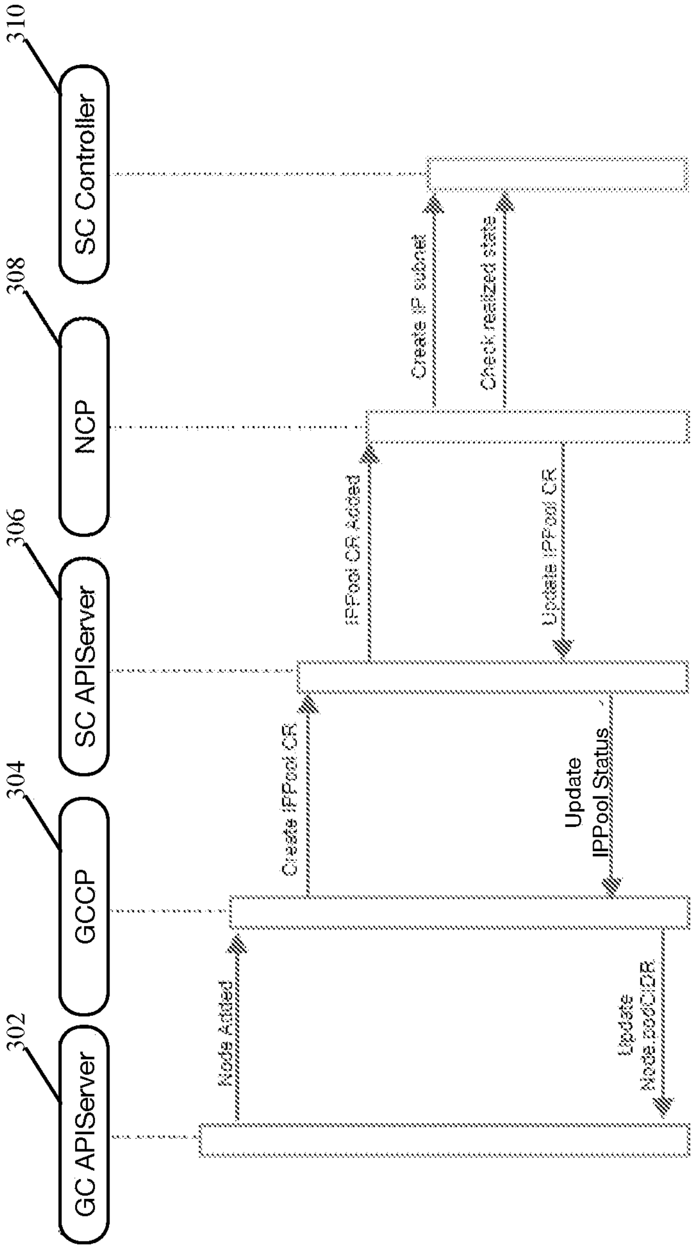
FIG. 3 conceptually illustrates a data flow diagram that illustrates how an IP pool of externally routable IP addresses is created for a worker node.

FIG. 3 presents a data flow diagram that illustrates how an IP pool of externally routable IP addresses is created for a worker node, so that IP addresses from this pool can be assigned to Pods operating on the worker node. As shown, the process starts when a GCCP service 304 receives notification from a GC API server 302 (e.g., a Kubernetes API server) that a worker node has been added to a guest cluster.

The GCCP service 304 then directs the SC API server 306 to create an IPPool custom resource. The SC API server 306 creates this resource from the IPPool CRD, and then notifies the NCP 308 that the IPPool CR has been added. The NCP then directs the SC controller 310 (e.g., an NSX-T controller cluster) to create one or more IP subnets that are specified in the created CR's specification. The NCP 308 then collects the realized state for the created IP subnet(s) from the SC controller 310. In some embodiments, the realized state includes the status values, such as the status values shown in FIG. 2, which include the created subnet values as well as the condition attributes.

The NCP 308 then provides the collected realized state information to the SC API Server 306, which then passes the creation of the IPPool CR and its state to the GCCP service 304. This manager then uses the received information to update its records, and to also direct the GC API Server 302 to update the Node.podCIDR. In this manner, the GCCP service 304 in some embodiments creates a single IPPool CR for each guest cluster, and after the NCP 308 allocates subnets from the SC Namespace IPPool for this CR, the GCCP service will set it to Node.podCIDR. The GCCP service also sets the Node name and subnet prefix and IP family in IPPool CR, while the NCP defines CIDR for IPPool CR.

When the Pod is created on a worker node and this Pod needs to have an externally routable IP address, an IP address is assigned to this Pod from the externally-routable IP pool that was created for this Pod through the IPPool CRD. To enable packets to reach this Pod from an external network (e.g., from a SC machine, another GC machine or a machine on the other side of the T0 router in FIG. 1), one or more static routes need to be defined for this Pod in the intervening routers.

To define such static routes, some embodiments use the RouteSet CRD 405 that is illustrated in FIG. 4. This figure also illustrates an example of a routeset1 CR 410 that is defined based on this CRD. As shown, the CRD 405 includes kind, metadata and spec attributes. The spec attribute includes group, version, scope and name attributes. The routeset1 CR 410 includes kind, metadata, spec and status attributes. The spec attribute specifies that each route has a destination that is the podCIDR, a target that is the IP addresses of the pod's worker node (i.e., nodeIPAddress) and a route name. The status attribute then provides the values for the destination, target and name attributes (e.g., as specified by the SC controller). The destination and target IP parameters are specified because when a Pod is created on a worker node, for a packet to reach the Pod, the packet first needs to be routed the worker node and then the Pod.

Figure 5:
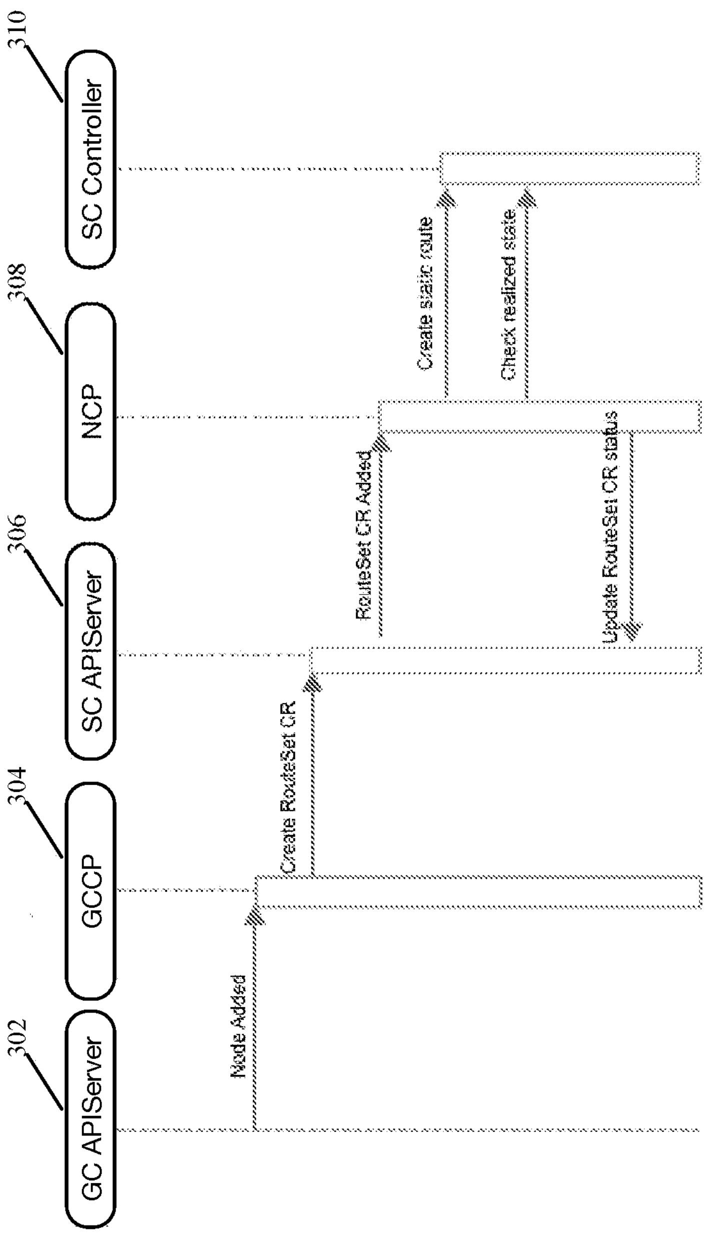
FIG. 5 conceptually illustrates a data flow diagram for creating a RouteSet CR for a worker node or a Pod that is instantiated.

FIG. 5 presents a data flow diagram for creating a RouteSet CR for a worker node or a Pod that is instantiated. As shown, the process starts when the GCCP service 304 receives notification from the GC API Server 302 that a worker node with a routable Pod has been added to a GC managed by the GCCP service 304. In some embodiments, this process also starts when the GCCP service receives notification that a new routable Pod has been added to a previously deployed worker node.

The GCCP service 304 then directs the SC API Server 306 to create a RouteSet CR. The API server 306 creates this CR, and also informs the NCP 308 of the creation of this CR. The NCP 308 then directs the SC controller 310 to create for the RouteSet CR instance one or more static routes, such as one or more static routes for the intervening T0 or T1 routers between the externally routable Pod's GC and the external machines that needs to reach the Pod (e.g., the machines in the other GCs, SC, or the machines in the external networks on the other side of the T0 router). The SC controller 310 in some embodiments also defines middlebox service rules and distributes these service rules to the gateways with the static routes (e.g., SC T1 router) and/or to middlebox service nodes (e.g., service VMs, service engines or service appliances) associated with these gateways, so that these gateways and/or service nodes can enforce these middlebox service rules on the packets that are sent to or received from the externally routable Pod.

The NCP 308 retrieves the status information for the RouteSet CR from the SC controller 310, and then provides this information to the SC API server 306, which then updates its created RouteSet CR status attributes to reflect this state information. Based on the route data that the SC controller receives from the NCP and provides to the NCP, the SC controller then creates one or more static routes in the intervening T0 and T1 routers between the externally routable Pod's GC and the external machines that needs to reach the Pod.

In some embodiments, the IPPool CR and RouteSet CR can be created only if routable-pod is enabled for the GC (e.g., for a GuestCluster CRD). As each GC has an SC ServiceAccount, the GCCP service in some embodiments creates a Role with permission to get/list/watch/create/delete/update the IPPool CRD and RouteSet CRD, and then bind the ServiceAccount with the Role. The GCCP service then authenticates to list/create/delete the IPPool CR and RouteSet CR in SC by using this ServiceAccount.

In some embodiments, the routes interface of a route controller in an upstream Kubernetes CP manager has the following structure

```
// Route is a representation of an advanced routing rule.
type Route struct {
   // Name is the name of the routing rule in the cloud-provider.
   Name string
   // TargetNode is the NodeName of the target instance.
   TargetNode types.NodeName
   // DestinationCIDR is the CIDR format IP range that this routing rule
   // applies to.
   DestinationCIDR string
   // Blackhole is set to true if this is a blackhole route
   // The node controller will delete the route if it is in the managed range.
   Blackhole bool
}
// Routes is an abstract, pluggable interface for advanced routing rules.
type Routes interface {
   // ListRoutes lists all managed routes that belong to the specified clusterName
   ListRoutes(ctx context.Context, clusterName string) ([ ]*Route, error)
   // CreateRoute creates the described managed route
   // route.Name will be ignored, although the cloud-provider may use nameHint
```

-continued

```
    // to create a more user-meaningful name.
    CreateRoute(ctx context.Context, clusterName string, nameHint string, route
*Route) error
    // DeleteRoute deletes the specified managed route
    // Route should be as returned by ListRoutes
    DeleteRoute(ctx context.Context, clusterName string, route *Route) error
  }
```

In some embodiments, the GCCP service gets RouteSet CR list from SC namespace, filters RouteSet CR that belong to this cluster, and only sends a return to route controller if CRD status "ready" is true. Also, the RouteSet CRD definition in some embodiments is added in GCCP service, so the GCCP service can create the RouteSet CR through API client interfaces. For NotReady RouteSet CR, the GCCP service in some embodiments would not re-create them but wait for the NCP to realize. In some embodiments, the GCCP service in some embodiments will request deletion of the RouteSet CR when there is a Node deleted, while the NC will request deletion of static routes for a GC when the GC is deleted.

The table below provides the mapping between RouteSet CR and Route struct in route controller in some embodiments.

| Route struct | RouteSet CR | Notes |
|---|---|---|
| name | metadata.name | nameHint is node UID.<br>We could set <nameHint>_<podCIDR> as the CR name |
| TargetNode | name<br>target | TargetNode is name of route<br>node IP address<br>IP family of node address and podCIDR should be the same.<br>There are 3 types of address: Hostname, ExternalIP or InternalIP, will choose node InternalIP address first, then ExternalIP address. |
| DestinationCIDR | destination | node.spec.podCIDR (single stack) or node.spec.podCIDRs (dual stack)<br>RouteSet CR is per Kubernetes cluster Node |

In some embodiments, NCP 308 creates IP blocks based on a NamespaceNetwork CR. After the NCP gets an IPPool CR event, the NCP creates the IP pool from the IP blocks. When the NamespaceNetwork CIDR does not exist, the NCP will create the IP pool from the SC Pod CIDR. FIG. 6 presents an example of an IP Pool API.

In some embodiments, the NCP 308 watches RouteSet CR events, and creates static routes on GC's T1 router. The GCCP service 304 in some embodiments creates RouteSet CR with a label. The NCP will check if route destination belongs to the SC namespace subnetCIDR or cluster container IP block. To manage static routes, the NCP 308 creates a RouteSet CR watcher, creates a RouteSet CR controller to process events, and creates RouteSet CR store and SC static route store.

Listed below are examples of APIs used in some embodiments to create, check, delete, and list static routes, while FIG. 7 illustrates an example of an API to create a static route on a T1 router.

```
  // Create static route
  PATCH /policy/api/v1/infra/tier-1s/<tier-1-id>/static-routes/<route-id>
  // Check static route realization status
  GET   /policy/api/v1/infra/realized-state/realized-entities\?intent_path\=/infra/tier-
1s/<tier-1-id>/static-routes
  /<route-id>
  // Delete static route
  DELETE /policy/api/v1/infra/tier-1s/<tier-1-id>/static-routes/<route-id>
  // List static routes by searching vnet-uid tag
  GET
/policy/api/v1/search/query\?query\=resource_type:StaticRoutes+AND+tags.scope:ncp/vnet_uid
+AND+tags.tag:
  <vnet_uid>
```

The above-described approach of using CRDs to deploy externally routable Pods has several advantages. It allows cloud providers and network administrators a very simple way of deploying and supporting Pods with externally routable IP Addresses. Such Pods can be directly addressed from a client external to the Guest Cluster. Also, the Pod IPs are preserved for traffic to external network, so external network services and servers can identify the source Pods and apply policies based on the Pod IPs. When Pods reach out to shared services, the source IP address is going to be the Pod IP address instead of the Nat'ed IP address.

Moreover, the GC data plane will not require encapsulation and the overhead associated with encapsulation protocols for routing to and from these Pods from and to the external networks. The Pod traffic will also be transparent to the SC fabric enabling the potential to deploy advanced SC services on the traffic. This approach also allows administrators to audit and trace egress requests from the Pods to common shared services. In addition to audit and traceability, there are deployment that have legacy applications that do not support connections over network addressed translated addresses.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 8:
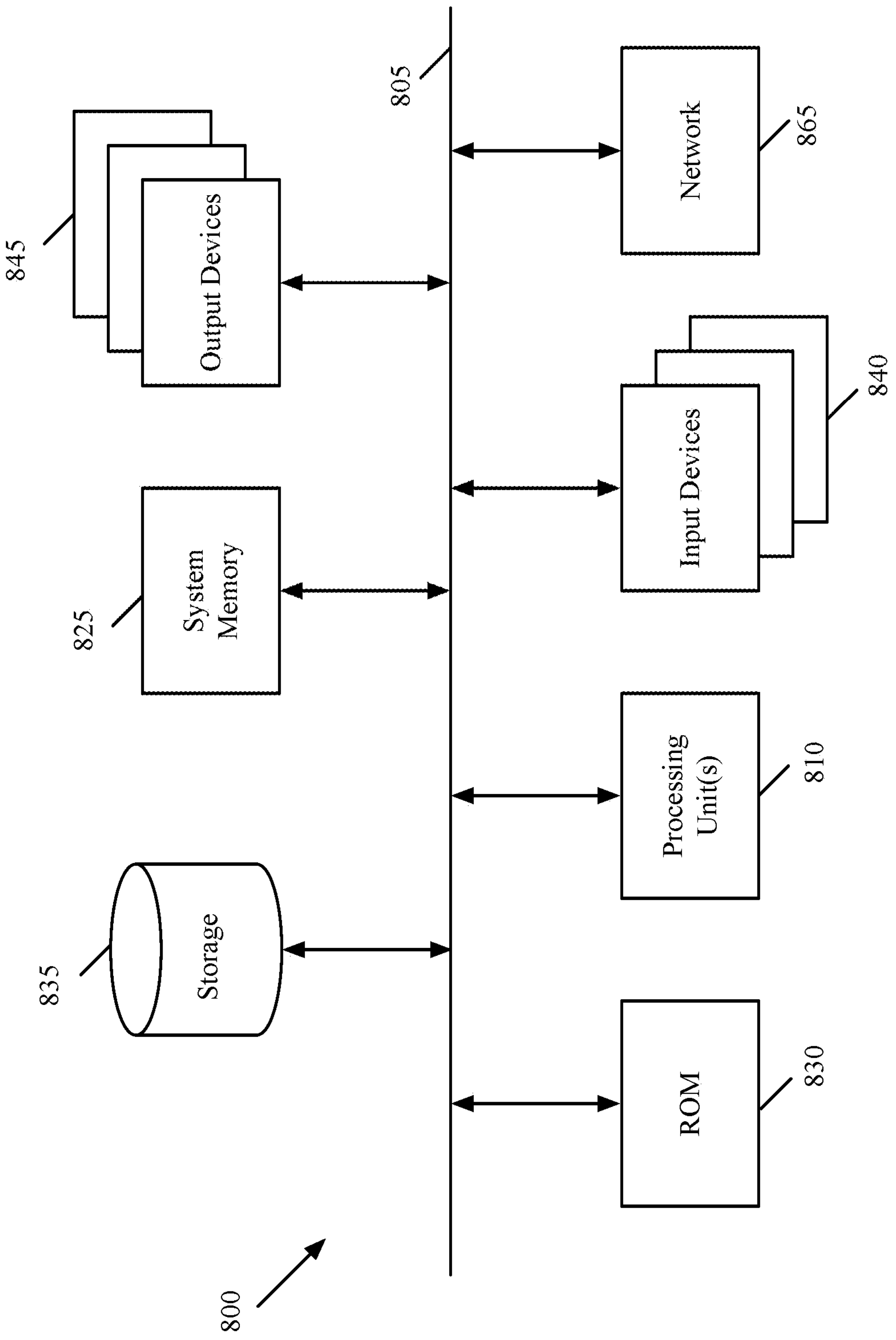
FIG. 8 conceptually illustrates a computer system with which some embodiments of the invention are implemented.

FIG. 8 conceptually illustrates a computer system 800 with which some embodiments of the invention are implemented. The computer system 800 can be used to implement any of the above-described computers and servers. As such, it can be used to execute any of the above described processes. This computer system includes various types of non-transitory machine readable media and interfaces for various other types of machine readable media. Computer system 800 includes a bus 805, processing unit(s) 810, a system memory 825, a read-only memory 830, a permanent storage device 835, input devices 840, and output devices 845.

The bus 805 collectively represents all system, peripheral, and chipset buses that communicatively connect the numerous internal devices of the computer system 800. For instance, the bus 805 communicatively connects the processing unit(s) 810 with the read-only memory 830, the system memory 825, and the permanent storage device 835.

From these various memory units, the processing unit(s) 810 retrieve instructions to execute and data to process in order to execute the processes of the invention. The processing unit(s) may be a single processor or a multi-core processor in different embodiments. The read-only-memory (ROM) 830 stores static data and instructions that are needed by the processing unit(s) 810 and other modules of the computer system. The permanent storage device 835, on the other hand, is a read-and-write memory device. This device is a non-volatile memory unit that stores instructions and data even when the computer system 800 is off. Some embodiments of the invention use a mass-storage device (such as a magnetic or optical disk and its corresponding disk drive) as the permanent storage device 835.

Other embodiments use a removable storage device (such as a flash drive, etc.) as the permanent storage device. Like the permanent storage device 835, the system memory 825 is a read-and-write memory device. However, unlike storage device 835, the system memory is a volatile read-and-write memory, such a random access memory. The system memory stores some of the instructions and data that the processor needs at runtime. In some embodiments, the invention's processes are stored in the system memory 825, the permanent storage device 835, and/or the read-only memory 830. From these various memory units, the processing unit(s) 810 retrieve instructions to execute and data to process in order to execute the processes of some embodiments.

The bus 805 also connects to the input and output devices 840 and 845. The input devices enable the user to communicate information and select commands to the computer system. The input devices 840 include alphanumeric keyboards and pointing devices (also called "cursor control devices"). The output devices 845 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 8, bus 805 also couples computer system 800 to a network 865 through a network adapter (not shown). In this manner, the computer can be a part of a network of computers (such as a local area network ("LAN"), a wide area network ("WAN"), or an Intranet, or a network of networks, such as the Internet. Any or all components of computer system 800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, and any other optical or magnetic media. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. A system comprising:

a first cluster comprising a plurality of worker nodes, each worker node being configured to host at least a network application, the first cluster being associated with a first virtual private cloud (VPC);

a supervisor cluster (SC) comprising a control plane, wherein the control plane is configured to:

detect a request to create a pool of addresses in response to a worker node addition in the first cluster;

allocate an externally routable subnet for the worker node;

define static routes between the pool of addresses and external networks through a gateway router associated with the SC; and the gateway router configured to route traffic between the first cluster and an external network based on the static routes.

2. The system of claim 1, wherein the network application comprises a Pod, the first cluster comprises a Kubernetes cluster.

3. The system of claim 1, wherein the pool of addresses comprises an IP Pool.

4. The system of claim 1, wherein the control plane is further configured to manage middlebox service rules to enable operations on data packets exchanges between externally routable applications and external clients.

5. The system of claim 1, wherein the control plane is further configured to provide the externally routable subnet to a server.

6. The system of claim 1, wherein the control plane is further configured to provide a status update to a manager of the first cluster to update a routing record.

7. The system of claim 1, wherein the control plane is further configured to update an IP Pool customer resource instance using at least the externally routable subnet.

8. The system of claim 1, wherein the external network comprises a network of the SC.

9. The system of claim 1, wherein the first VPC comprises a set of managers to manage compute and network resources.

10. The system of claim 1, further comprising middlebox service rule to perform a middlebox service operation on packets sent between the first cluster and an external network based on the static routes.

11. A method of deploying an externally routable network application in a first cluster associated with a first virtual private cloud (VPC), the method comprising:

detecting, at a control plane of a supervisor cluster (SC), a request to create a pool of addresses in response to the addition of a worker node within the first cluster;

allocating, by the control plane, an externally routable subnet for the worker node;

defining static routes between the pool of addresses and external networks via a gateway router associated with the SC; and routing, by the gateway router, traffic between the first cluster and the external network based on the static routes.

12. The method of claim 11, wherein the network application comprises a Pod, and wherein deploying the externally routable network application further includes configuring the first cluster as a Kubernetes cluster.

13. The method of claim 11, wherein creating the pool of addresses includes creating an IP Pool to serve as the address pool for the network applications hosted by the worker nodes in the first cluster.

14. The method of claim 11, further comprising managing middlebox service rules at the control plane to enable operations on data packets exchanged between externally routable applications and external clients.

15. The method of claim 11, further comprising providing the allocated externally routable subnet to a server, wherein the server uses the externally routable subnet to configure the network application as accessible from the external network.

16. The method of claim 11, further comprising providing a status update to a manager of the first cluster, wherein the status update enables the manager to update a routing record for the network application hosted on the worker node.

17. The method of claim 11, further comprising updating an IP Pool custom resource instance in the first cluster with the externally routable subnet to enable external accessibility for the network application on the worker node.

18. The method of claim 11, wherein the external network includes a network associated with the supervisor cluster (SC) that allows communication between the first cluster and other clusters managed by the SC.

19. The method of claim 11, wherein managing resources in the first VPC includes managing compute and network resources by a set of managers associated with the first VPC.

20. The method of claim 11, further comprising enforcing a middlebox service rule at the gateway router, wherein the middlebox service rule performs a designated operation on packets exchanged between the first cluster and the external network based on the static routes.

* * * * *